(12) United States Patent
Bao et al.

(10) Patent No.: US 11,579,409 B2
(45) Date of Patent: Feb. 14, 2023

(54) INFRARED OPTICAL IMAGING LENS, CAMERA MODULE AND DRIVER MONITOR SYSTEM

(71) Applicant: JIANGXI LIANCHUANG ELECTRONIC CO., LTD., Nanchang (CN)

(72) Inventors: Yumin Bao, Nanchang (CN); Xiaobai Hong, Nanchang (CN); Xuming Liu, Nanchang (CN); Kemin Wang, Nanchang (CN); Jiyong Zeng, Nanchang (CN)

(73) Assignee: JIANGXI LIANCHUANG ELECTRONIC CO., LTD., Nanchang (CN)

( * ) Notice: Subject to any disclaimer, the term of this patent is extended or adjusted under 35 U.S.C. 154(b) by 36 days.

(21) Appl. No.: 17/138,933

(22) Filed: Dec. 31, 2020

(65) Prior Publication Data

US 2021/0124148 A1    Apr. 29, 2021

Related U.S. Application Data

(63) Continuation-in-part of application No. PCT/CN2020/108253, filed on Aug. 10, 2020.

(30) Foreign Application Priority Data

Oct. 29, 2019 (CN) .................... CN201911033997X

(51) Int. Cl.
*G02B 13/00* (2006.01)
*H04N 5/225* (2006.01)
(Continued)

(52) U.S. Cl.
CPC .......... *G02B 13/0035* (2013.01); *G02B 9/12* (2013.01); *G02B 13/14* (2013.01); *H04N 5/2253* (2013.01);
(Continued)

(58) Field of Classification Search
CPC ...... G02B 13/0035; G02B 9/12; G02B 13/14; H04N 5/2253; H04N 5/2254; H04N 7/18; H04N 5/23229
See application file for complete search history.

(56) References Cited

U.S. PATENT DOCUMENTS

2004/0021957 A1    2/2004  Imasashi
2006/0072211 A1*   4/2006  Imamura ........ G02B 15/144511
                                                          359/686
(Continued)

FOREIGN PATENT DOCUMENTS

CN    1677153 A    10/2005
CN    102236150 A  11/2011
(Continued)

OTHER PUBLICATIONS

SIPO, First Office Action for CN Application No. 201911033997.X, dated Mar. 30, 2021.
(Continued)

*Primary Examiner* — Nasim N Nirjhar

(57) ABSTRACT

The disclosure provides an infrared optical imaging lens, a camera module and a DMS. From an object side to an image side along an optical axis, the infrared optical imaging lens sequentially includes a stop, a first lens with a positive refractive power, a second lens with a positive refractive power, a third lens with a negative refractive power, and a filter. An object side surface of the first lens is convex, an image side surface of the first lens is concave. An object side surface of the second lens is concave, an image side surface of the second lens is convex. A paraxial portion of an object side surface of the third lens is convex, and a paraxial portion of an image side surface of the third lens is concave.

17 Claims, 11 Drawing Sheets

(51) Int. Cl.
*H04N 7/18* (2006.01)
*G02B 9/12* (2006.01)
*G02B 13/14* (2006.01)
*H04N 5/232* (2006.01)

(52) U.S. Cl.
CPC ............ *H04N 5/2254* (2013.01); *H04N 7/18* (2013.01); *H04N 5/23229* (2013.01)

(56) References Cited

U.S. PATENT DOCUMENTS

| | | | |
|---|---|---|---|
| 2010/0202064 A1 | 8/2010 | Tang et al. | |
| 2015/0108597 A1* | 4/2015 | Chen | G02B 13/0035 359/716 |
| 2017/0227742 A1* | 8/2017 | Hsieh | G02B 27/027 |
| 2017/0285305 A1* | 10/2017 | Lai | G02B 9/64 |
| 2018/0348488 A1 | 12/2018 | Maiko et al. | |
| 2019/0004286 A1* | 1/2019 | Heu | G02B 15/143 |

FOREIGN PATENT DOCUMENTS

| | | |
|---|---|---|
| CN | 104570292 A | 4/2015 |
| CN | 105022140 A | 11/2015 |
| CN | 105372793 A | 3/2016 |
| CN | 109828346 A | 5/2019 |
| CN | 209044153 U | 6/2019 |
| CN | 110187471 A | 8/2019 |
| CN | 110531505 A | 12/2019 |
| CN | 111061046 A | 4/2020 |
| JP | 2004252312 A | 9/2004 |

OTHER PUBLICATIONS

SIPO, Office Action issued for CN Appiication No. 201911033997.X, dated Jun. 3, 2021.
WIPO, International search report for PCT application No. PCT/CN2020/108253, dated Nov. 16, 2020.
WIPO, Written opinion of the international search authority for PCT application No. PCT/CN2020/108253, dated Nov. 16, 2020.

* cited by examiner

INFRARED OPTICAL IMAGING LENS, CAMERA MODULE AND DRIVER MONITOR SYSTEM

CROSS REFERENCE TO RELATED APPLICATION

This application is a continuation-in-part of International Application No. PCT/CN2020/108253 filed on Aug. 10, 2020. The International Application No, PCT/CN2020/108253 claims priority to a Chinese application No. CN201911033997.X filed on Oct. 29, 2019. The contents of the aforementioned applications are incorporated herein by reference.

TECHNICAL FIELD

The disclosure relates to the field of lens imaging technologies, and more particularly, to an infrared optical imaging lens, an imaging device, a camera module, and a driver monitor system.

BACKGROUND

Industry-related data shows that, 80% of road safety accidents are directly or indirectly caused by drivers' dangerous driving. If the driver's driving behavior could be detected and the driver could be reminded in time, the probability of traffic accidents would be effectively reduced.

A Driver Monitor System (DMS) uses images captures by a DMS camera to detect the driver's driving behavior and physiological state through visual tracking, target detection, motion recognition and other technologies. When the driver is fatigued, distracted, calling, smoking, not wearing a seat belt or in other dangerous situations, the system will alarm within the set time to avoid accidents. The DMS system can effectively regulate the driver's driving behavior, reduce accidents caused by human error, and escort driving safety.

When using the DMS camera to detect the driver's driving behavior and facial information, it is necessary to select a suitable light source. In order to reduce the impact of ambient light on imaging, the intensity of the active light source needs to be higher than that of the ambient light, but strong light will interfere with the human eyes and reduce the user's comfort. Therefore, the active light source should locate in the invisible band, such as infrared light band, ultraviolet light band, etc. Long-term exposure to ultraviolet light is likely to cause permanent damage to human skin and eyes. The mid-to-far infrared band light imaging will lose most of the information on the surface of the object, which is generally not used for object imaging. Therefore, the near-infrared band light becomes the best choice for DMS systems. That is, the camera used in the DMS system needs to have good imaging capabilities in the near-infrared band to ensure that the system is also applicable in complex lighting environments such as night, backlight, shade and sunlight.

With the increasing miniaturization of optoelectronic components, the DMS system needs to be equipped with a small and low-cost infrared optical imaging lens to meet the needs of use. However, in the prior art, spherical glass lenses are often used which are bulky and costly. Although the use of all-plastic lenses can reduce the volume, however, the thermal expansion coefficient of the plastic material is large, which easily causes the lens to appear focal points offset problem due to temperature changes.

SUMMARY

In view of the above problems, the disclosure provides an infrared optical imaging lens, having the advantages of miniaturization, low cost and high imaging quality.

Embodiments of the disclosure achieve the above object through the following technical solutions.

In a first aspect, the disclosure provides an infrared optical imaging lens. From an object side to an image side along an optical axis of the lens, the lens sequentially includes: a stop, a first lens with a positive refractive power, a second lens with a positive refractive power, a third lens with a negative refractive power, and a filter. An object side surface of the first lens is convex, an image side surface of the first lens is concave. An object side surface of the second lens is concave, an image side surface of the second lens is convex. A paraxial portion of an object side surface of the third lens is convex, and a paraxial portion of an image side surface of the third lens is concave. The first lens is a glass lens, the second lens and the third lens are both plastic aspherical lenses. The infrared optical imaging lens meets the expression: $T_L/(IH/\tan\theta)<1.5$, where $T_L$ represents a total optical length of the infrared optical imaging lens, $\theta$ represents the half-field of view of the infrared optical imaging lens, IH represents the half image height of the infrared optical imaging lens.

In a second aspect, the disclosure provides an imaging device. The imaging device includes the infrared optical imaging lens provided in the first aspect and an imaging element which is configured to convert an optical image formed by the infrared optical imaging lens into electrical signals.

In a third aspect, the disclosure provides a camera module. The camera module includes a barrel, a holder, an image sensor, a printed circuit board, and the infrared optical imaging lens as stated above. The infrared optical imaging lens is mounted in the barrel, the image sensor is mounted in the holder, and the barrel is movably mounted on the holder. The infrared optical imaging lens is configured to form an optical image. The image sensor is opposite to the infrared optical imaging lens and is configured to generate image data for the optical image sensed thereby.

In a fourth aspect, the disclosure provides a DMS. The DMS includes a memory, a processor, and the camera module as described above. The memory and the camera module are both electrically connected with the processor. The camera module is configured to capture images, the processor is configured to acquire and process image data of the captured images, the memory is configured to store the image data of the captured images.

Compared with the prior art, the infrared optical imaging lens adopts a design of one glass lens and two plastic lenses, achieves a miniaturization of the lens and effectively reduces the cost by reasonably matching the refractive power of the three lenses. Moreover, the infrared optical imaging lens can be clearly imaged in the 800 nm~1100 nm (near-infrared region) waveband, and has good imaging quality under near-infrared light conditions. That is, it can meet the infrared imaging characteristics of the DMS and meet the high imaging quality requirements.

MAIN REFERENCE NUMERALS

Figure 1:
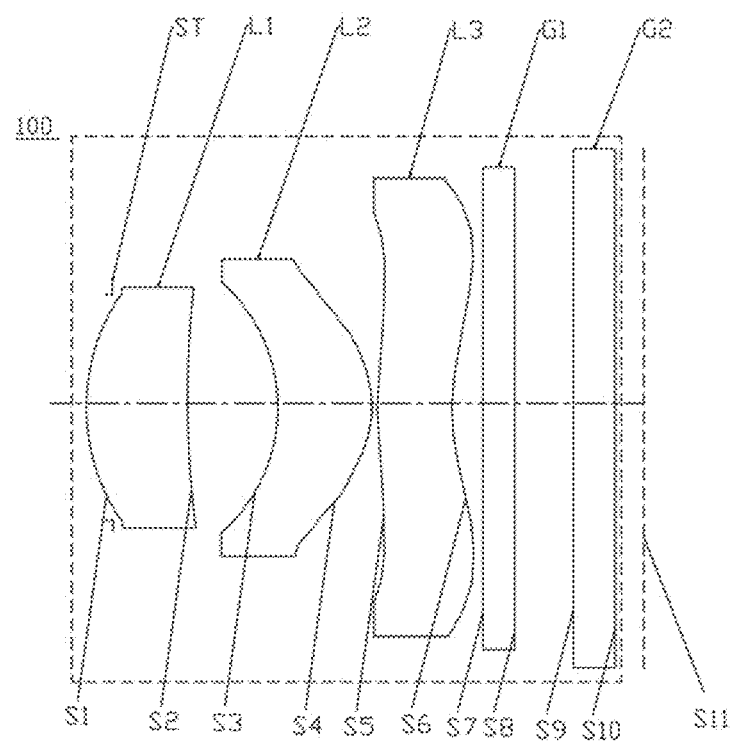
FIG. 1 is a schematic structural diagram of an infrared optical imaging lens in a first embodiment of the disclosure.

| Infrared optical imaging lens | 100, 200 | Imaging device | 300 |
| First lens | L1 | Second lens | L2 |
| Third lens | L3 | Stop | ST |
| Filter | G-1 | Flat glass | G2 |
| Object side surface of the first lens | S1 | Image side surface of the first lens | S2 |
| Object side surface of the second lens | S3 | Image side surface of the second lens | S4 |
| Object side surface of the third lens | S5 | Image side surface of the third lens | S6 |
| Object side surface of the filter | S7 | Image side surface of the filter | S8 |
| Object side surface of the flat glass | S9 | Image side surface of the flat glass | S10 |
| Imaging surface | S11 | Imaging element | 310 |
| Camera module | 400 | Barrel | 401 |
| Holder | 402 | Image sensor | 403 |
| Printed circuit board | 404 | DMS | 500 |
| Memory | 501 | Processor | 502 |
| Car | 600 | | |

The following embodiments will further illustrate the present disclosure with reference to the above drawings.

DETAILED DESCRIPTION OF PREFERRED EMBODIMENTS

In order to facilitate a better understanding of the present disclosure, the present disclosure will be further explained below with reference to the accompanying drawings. The embodiments of the present disclosure are shown in the drawings, but the present disclosure is not limited to the above-mentioned preferred embodiments. In the contrary, these embodiments are provided to make the disclosure more sufficient.

The disclosure provides an infrared optical imaging lens. From an object side to an image side along an optical axis of the lens, the lens sequentially includes: a stop, a first lens with a positive refractive power, a second lens with a positive refractive power, a third lens with a negative refractive power, and a filter. An object side surface of the first lens is convex, an image side surface of the first lens is concave, an object side surface of the second lens is concave, an image side surface of the second lens is convex. A paraxial portion of an object side surface of the third lens is convex, and a paraxial portion of an image side surface of the third lens is concave. The first lens is a glass lens, the second lens and the third lens are both plastic aspherical lenses. The infrared optical imaging lens meets the expression: $T_L/(IH/\tan \theta)<1.5$, where $T_L$ represents a total optical length of the infrared optical imaging lens, θ represents the half-field of view of the infrared optical imaging lens, IH represents the half image height of the infrared optical imaging lens. This expression indicates that when the relationship between the half field angle and the half image height is certain, the infrared optical imaging lens has a smaller total optical length which reduce the volume of the lens effectively.

The stop is configured to limit a diameter of the aperture. The stop is arranged before the first lens in the disclosure, it makes the position of entrance pupil move forward thereby eliminating the influence of the stop on the distortion. The first lens is mainly used for light collection, the second lens is mainly used to correct the field curvature and the astigmatism, and the third lens is mainly used to correct aberrations such as the astigmatism and the distortion, as well as to realize the control of the light exit angle. The use of the plastic aspheric lenses can effectively correct the spherical aberration, reduce the total optical length, reduce the volume of the lens, and realize the miniaturization of the lens.

In some embodiments, the infrared optical imaging lens meets the expression:

$$1<|R11-R12|/CT1<5; \qquad (1)$$

where R11 represents a radius of curvature of the object side surface of the first lens, R12 represents a radius of curvature of the image side surface of the first lens, CT1 represents a center thickness of the first lens. Satisfying the expression (1) can effectively improve the ma chi suability of the first lens and make it easy to assemble.

In some embodiments, the infrared optical imaging lens meets the expression:

$$0.15<(\varphi 2+\varphi 3)/\varphi <0.35; \qquad (2)$$

where $\varphi 2$ represents a refractive power of the second lens, $\varphi 3$ represents a refractive power of the third lens, $\varphi$ represents a refractive power of the infrared optical imaging lens. Satisfying the expression (2) can effectively correct the field curvature of the infrared optical imaging lens and improve the resolution of the infrared optical imaging lens.

In some embodiments, the infrared optical imaging lens meets the expression:

$$0.7<\varphi 1/\varphi <0.9; \qquad (3)$$

where $\varphi 1$ represents a refractive power of the first lens, $\varphi$ represents a refractive power of the infrared optical imaging lens. The ratio of the refractive power of the first lens to the refractive power of the infrared optical imaging lens satisfies the above expression (3), winch can effectively correct the astigmatism of the infrared optical imaging lens and improve the resolution of the infrared optical imaging lens.

In some embodiments, the infrared optical imaging lens meets the expression:

$$-1.0\times 10^{-6}/°\text{ C.}<(dn/dt)1<3.0\times 10^{-6}/°\text{ C.}; \qquad (4)$$

where $(dn/dt)1$ represents a temperature coefficient of the refractive index of the first lens material. Satisfying the expression (4) can effectively reduce the sensitivity of the infrared optical imaging lens to the temperature and enhance the stability of the resolution at different temperatures.

In some embodiments, the infrared optical imaging lens meets the expression:

$$-0.3<(R11/R12)-(R22/R21)<0; \qquad (5)$$

where R11 represents a radius of curvature of the object side surface of the first lens, R12 represents a radius of curvature of the image side surface of the first lens, R21 represents a radius of curvature of the object side surface of the second lens, R22 represents a radius of curvature of the image side surface of the second lens. When the expression (5) is satisfied, the first lens and the second lens form a symmetrical structure in the imaging system, it can improve system aberrations well.

In some embodiments, the infrared optical imaging lens meets the expression:

$$SD11/f/\tan\theta <0.67; \qquad (6)$$

where SD11 represents the maximum effective radius of the object side surface of the first lens, f represents an effective focal length of the infrared optical imaging lens, and $\theta$ represents the half-field of view of the infrared optical imaging lens. When the expression (6) is satisfied, the effective focal length of the system can be achieved while ensuring the aperture of the front-end is small.

In some embodiments, the infrared optical imaging lens meets the expressions:

$$n2-n3=0, v2-v3=0; \qquad (7)$$

where n2 represents the refractive index of the second lens, n3 represents the refractive index of the third lens, v2 represents the dispersion coefficient of the second lens, and v3 represents the dispersion coefficient of the third lens. Satisfying this expression (7) can make sure that the second lens and the third lens are made of the same material, avoid some processing and testing problems because of using various materials, effectively reduce the technical input cost in actual production, and meet standards of mass production.

In some embodiments, the infrared optical imaging lens meets the expression:

$$0.16\text{ mm}^{-1}<SD11/IH/SD32<0.19\text{ mm}^{-1}; \qquad (8)$$

where SD11 represents the maximum effective radius of object side surface of the first lens, IH represents the half image height of the infrared optical imaging lens, SD32 represents the maximum effective radius of image side surface of the third lens. Satisfying this expression (8) is beneficial to realize the control of the incident angle and the exit angle of the light and to ensure the image height requirements.

In some embodiments, the applicable spectral range of the infrared optical imaging lens is 800 mi to 1100 nm. Conventional lenses are designed to be applicable at the wavelength range of 435 nm~656 nm (visible light), and have poor resolution at the wavelength range of the infrared light. However, the infrared optical imaging lens provided by the disclosure can clearly linage in the wavelength band of 800 nm~1100 nm (near infrared region), has good imaging quality under near-infrared light conditions, and can meet the imaging requirements of infrared imaging in the DMS system.

In some embodiments, the first lens is a spherical lens. The first lens adopts a glass spherical lens, and the second lens and the third lens adopt plastic aspherical lenses. The design of combining the glass lens and the plastic lens can effectively reduce the production cost of the infrared optical imaging lens.

In some embodiments, the first lens can also be an aspheric lens, which can improve the imaging quality of the infrared optical imaging lens.

In some embodiments, the present disclosure provides an imaging device. The imaging device includes the infrared optical imaging lens as mentioned in any above embodiments and an imaging element which is used to convert an optical image formed by the infrared optical imaging lens into electrical signals.

The shapes of aspheric surfaces of the lens provided by the embodiments of the present disclosure satisfy the following equation:

$$z=\frac{ch^2}{1+\sqrt{1-(1+K)c^2h^2}}+Bh^4+Ch^6+Dh^8+Eh^{10}+Fh^{12}$$

where z represents a vector height between a positron on the surface and a vertex of the surface along an optical axis of the lens, c represents a curvature of the vertex of the surface, K is a quadratic surface coefficient, h is a distance between the position on the surface and the optical axis, B is a fourth order surface coefficient, C is a sixth order surface coefficient, D is an eighth order surface coefficient, E is a tenth order surface coefficient, F is a twelfth order surface coefficient.

In each of the following embodiments, the thickness, the radius of curvature, and the material of each lens in the infrared optical imaging lens are different. Details can be referred to parameter tables provided in the following embodiments.

First Embodiment

FIG. 1 illustrates an infrared optical imaging lens 100 including three pieces of lens, according to a first embodiment of the disclosure. From an object side to an image side, the infrared optical imaging lens sequentially includes a stop ST, a first lens L1, a second lens L2, a third lens L3, a filter G1, and a flat glass G2.

The first lens L1 is a glass spherical lens with a positive refractive power, an object side surface SI of the first lens L1 is a convex surface, and an image side surface 82 of the first lens L1 is a concave surface.

The second lens L2 is a plastic aspheric lens with a positive refractive power, an object side surface S3 of the second lens L2 is a concave surface, and an image side surface S4 of the second lens L2 is a convex surface.

The third lens L3 is a plastic aspheric lens with a negative refractive power, a paraxial portion of an object side surface S5 of the third lens L3 is convex, and a paraxial portion of an image side surface S6 of the third lens L3 is concave.

Relevant parameters of every lens of the infrared optical imaging lens 100 are shown in Table 1.

TABLE 1

| Surface NO. | Sign | Radius of curvature (mm) | Thickness (mm) | Refractive index | Abbe number |
|---|---|---|---|---|---|
| | Object surface | — | | | |
| ST | Stop | — | −0.16 | | |
| S1 | First lens L1 | 2.131 | 0.93 | 1.73 | 54.7 |
| S2 | | 5.982 | 0.95 | | |
| S3 | Second lens L2 | −1.907 | 0.91 | 1.64 | 23.5 |
| S4 | | −0.969 | 0.07 | | |
| S5 | Third lens L3 | 3.596 | 0.50 | 1.64 | 23.5 |
| S6 | | 1.073 | 0.30 | | |
| S7 | Filter G1 | — | 0.30 | 1.52 | 64.2 |
| S8 | | — | 0.48 | | |
| S9 | Flat glass G2 | — | 0.40 | 1.52 | 64.2 |
| S10 | | — | 0.125 | | |
| S11 | Imaging surface | — | — | | |

In this embodiment, aspherical parameters of every lens of the infrared optical imaging lens 100 are shown in Table 2.

TABLE 2

| Surface No. | K | B | C | D | E | F |
|---|---|---|---|---|---|---|
| S3 | −7.705 | −0.139 | −0.096 | 0.093 | 0.043 | −0.031 |
| S4 | −4.581 | −0.257 | 0.245 | −0.206 | 0.107 | −0.018 |
| S5 | −1.164 | −0.184 | 0.104 | −0.03 | 3.80E-03 | −1.33E-04 |
| S6 | −6.765 | −0.096 | 0.039 | −9.72E-03 | 1.10E-03 | −5.51E-05 |

In this embodiment, the curves of the field curvature, the distortion, the longitudinal chromatic aberration and the lateral chromatic aberration are shown in FIG. 2, FIG. 3, FIG. 4, and FIG. 5 respectively. From FIG. 2 to FIG. 5, it is apparent that the field curvature, the distortion, and the chromatic aberration can be well corrected.

Figure 2:
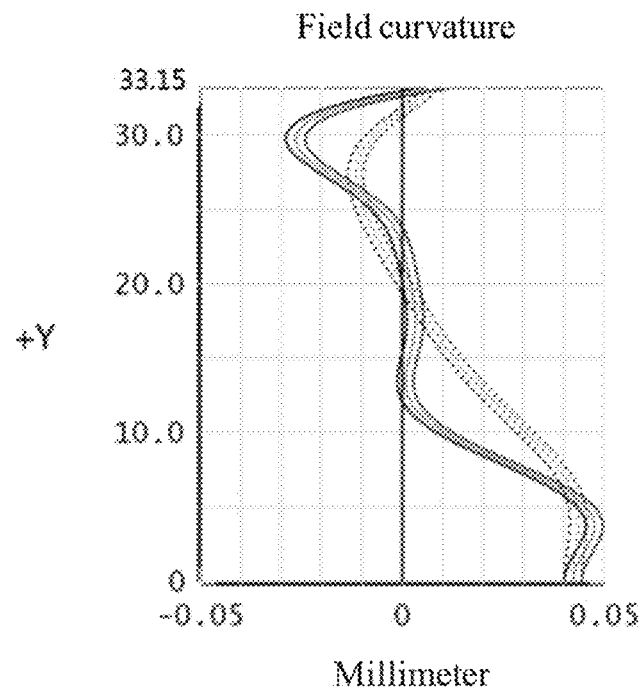
FIG. 2 is a diagram showing field curvature curves of the infrared optical imaging lens in the first embodiment of the disclosure.

It can be seen from FIG. 2 that the field curvature of the infrared optical imaging lens 100 provided in this embodiment does not exceed ±0.05 mm, and the difference between field curvatures respectively in the meridian direction and the sagittal direction at the same wavelength does not exceed 0.08 mm. This indicates the field curvature is well corrected.

Figure 3:
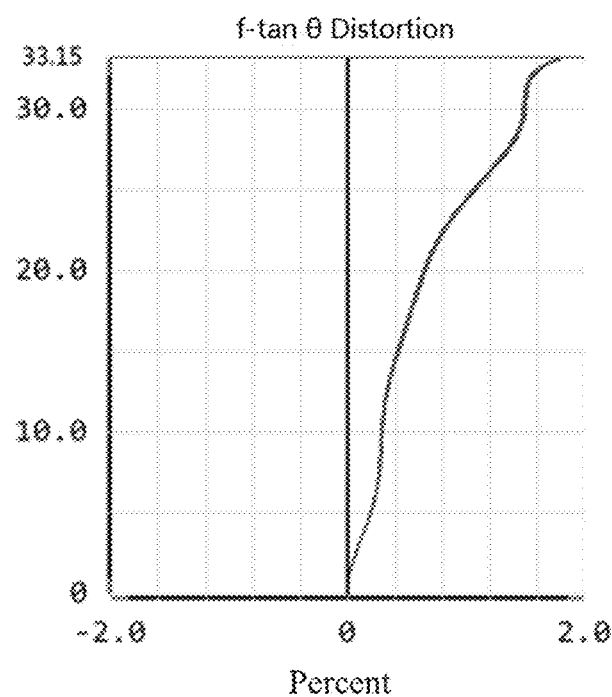
FIG. 3 is a diagram showing f-tan θ distortion curves of the infrared optical imaging lens in the first embodiment of the disclosure.

It can be seen from FIG. 3 that the absolute value of the optical distortion of the infrared optical imaging lens 100 provided in this embodiment is less than 2% in the entire field of view. It indicates that the distortion is well corrected, so that captured images have too slight distortion and are not required to be corrected in digital.

Figure 4:
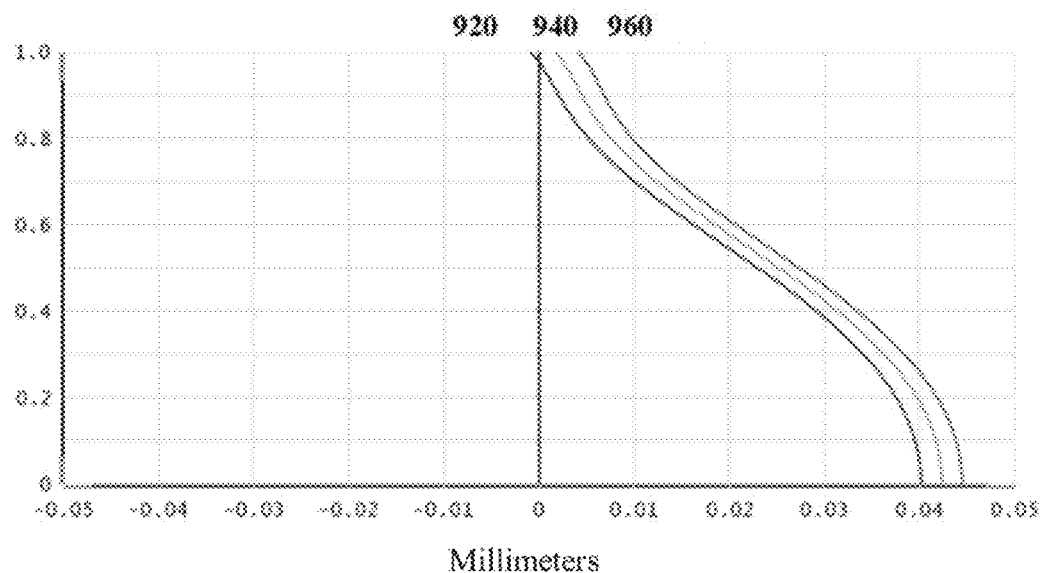
FIG. 4 is a diagram showing longitudinal aberration curves of the infrared optical imaging lens in the first embodiment of the disclosure.

It can be seen from FIG. 4 that the longitudinal chromatic aberration of the infrared optical imaging lens 100 provided by this embodiment is within ±0.05 mm in the entire field of view. Three curves from the negative axis direction to the positive axis direction illustrated in FIG. 4 respectively correspond to the longitudinal chromatic aberration curves of the infrared optical imaging lens 100 at the wavelength of 920 nm, 940 nm, and 960 nm.

Figure 5:
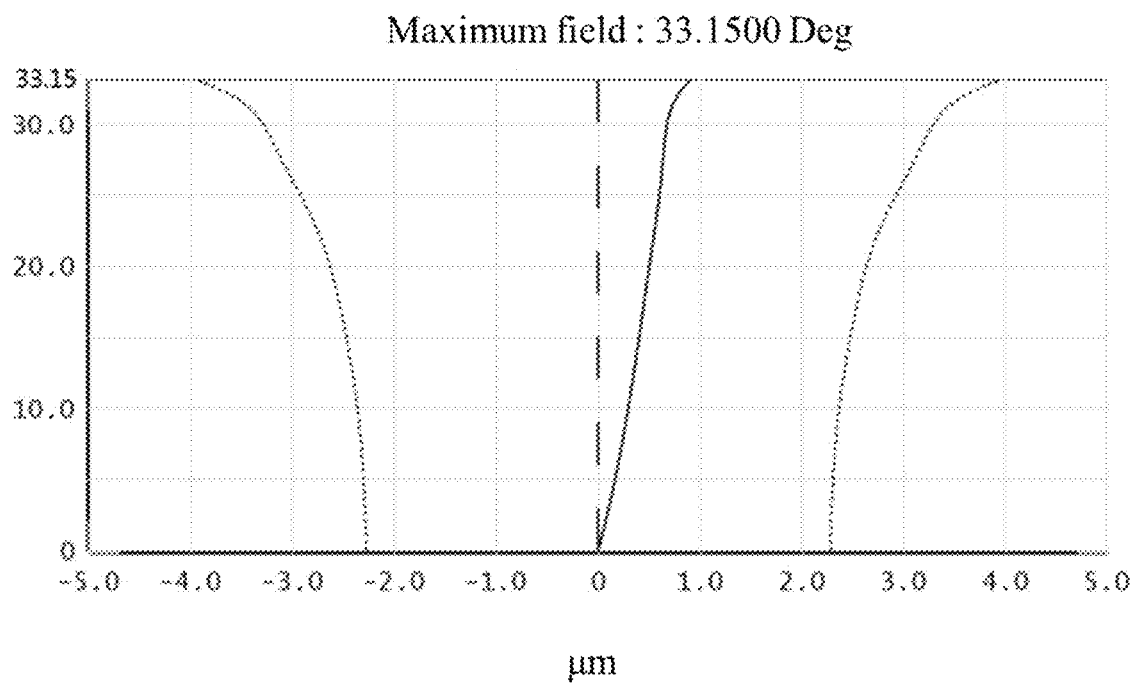
FIG. 5 is a diagram showing lateral chromatic aberration curves of the infrared optical imaging lens in the first embodiment of the disclosure.
Figure 6:
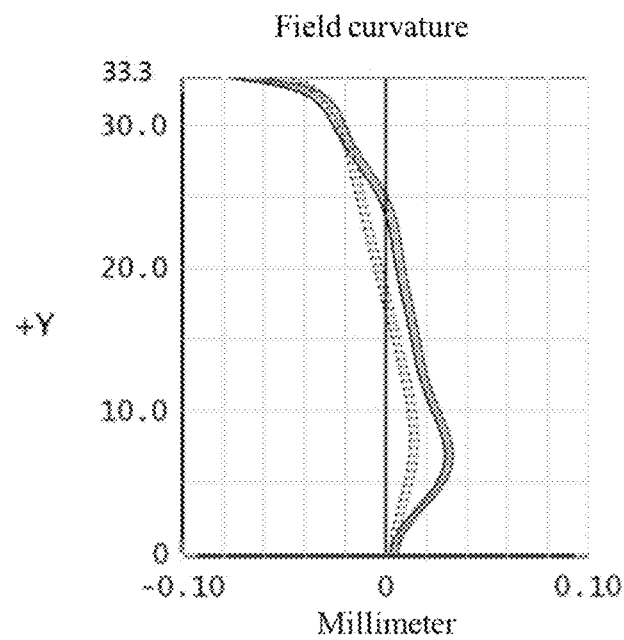
FIG. 6 is a diagram showing field curvature curves of the infrared optical imaging lens in a second embodiment of the disclosure.
Figure 7:
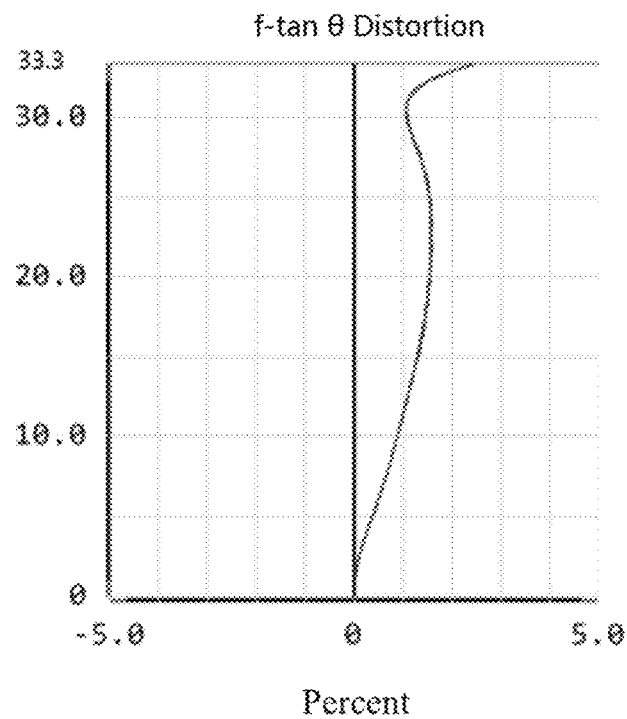
FIG. 7 is a diagram showing f-tan θ distortion curves of the infrared optical imaging lens in the second embodiment of the disclosure.
Figure 8:
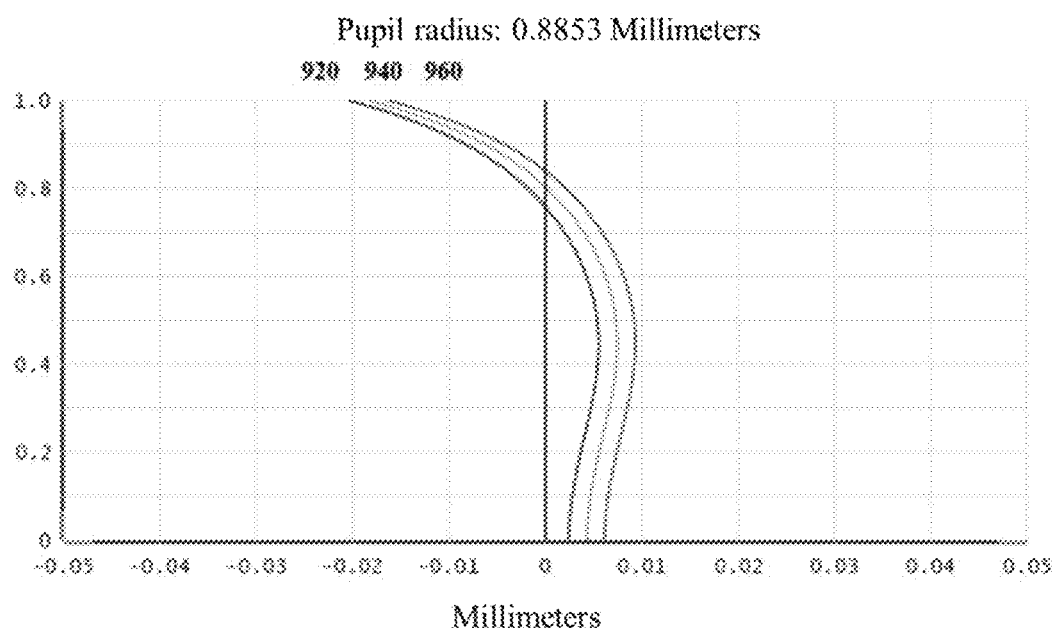
FIG. 8 is a diagram showing longitudinal aberration curves of the infrared optical imaging lens in the second embodiment of the disclosure.
Figure 9:
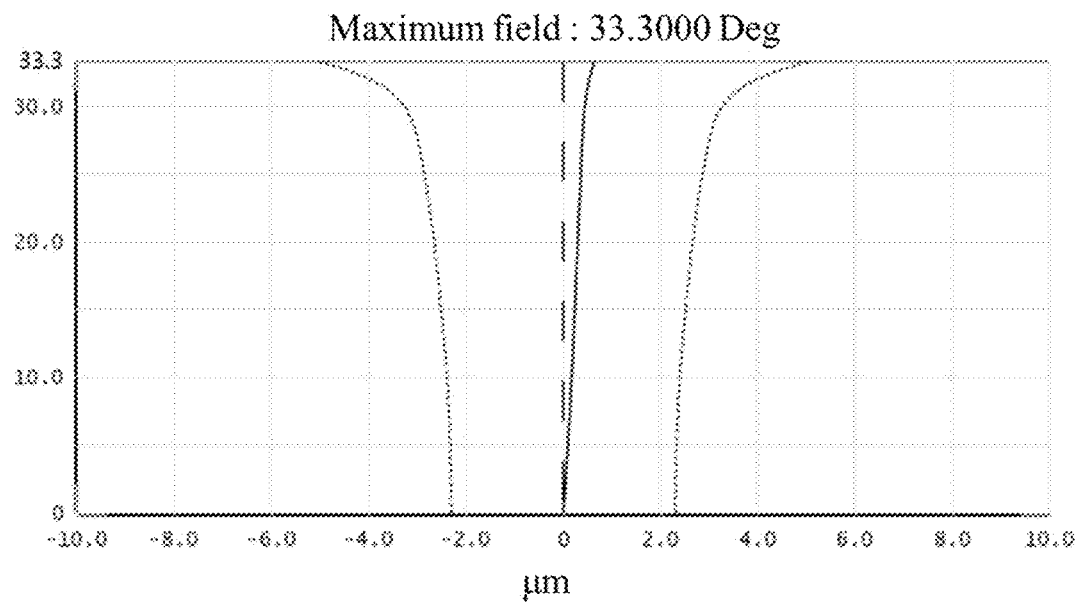
FIG. 9 is a diagram showing lateral chromatic aberration curves of the infrared optical imaging lens in the second embodiment of the disclosure.

It can be seen from FIG. 5 that the lateral chromatic aberration in the wavelength range from 920 to 960 run of the infrared optical imaging lens 100 provided in this embodiment is less than 1.0 μm in the entire field of view, and the difference of vertical axis chromatic aberrations at different wavelengths is very small. This indicates the chromatic aberration of the lens at the near-infrared wavelength band is well corrected.

Embodiment 2

An infrared optical imaging lens of this embodiment is substantially similar to the infrared optical imaging lens 100 of the first embodiment, except that the radius of curvature and the material of each lens in this embodiment are different from that of the first embodiment.

Relevant parameters of event lens of the infrared optical imaging lens provided in this embodiment are shown in Table 3.

TABLE 3

| Surface NO. | Sign | Radius of curvature (mm) | Thickness (mm) | Refractive index | Abbe number |
|---|---|---|---|---|---|
| | Object surface | — | | | |
| ST | Stop | — | −0.15 | | |
| S1 | First lens L1 | 2.304 | 1.20 | 1.73 | 54.7 |
| S2 | | 6.706 | 0.77 | | |

TABLE 3-continued

| Surface NO. | Sign | Radius of curvature (mm) | Thickness (mm) | Refractive index | Abbe number |
|---|---|---|---|---|---|
| S3 | Second lens L2 | −1.774 | 0.85 | 1.54 | 56.0 |
| S4 | | −1.069 | 0.14 | | |
| S5 | Third lens L3 | 2.044 | 0.50 | 1.54 | 56.0 |
| S6 | | 1.050 | 0.50 | | |
| S7 | Filter G1 | — | 0.30 | 1.52 | 64.2 |
| S8 | | — | 0.28 | | |
| S9 | Flat glass G2 | — | 0.40 | 1.52 | 64.2 |
| S10 | | — | 0.125 | | |
| S11 | Imaging surface | — | — | | |

In this embodiment, aspherical parameters of every lens of the optical imaging lens provided in this embodiment are shown in Table 4.

TABLE 4

| Surface No. | K | B | C | D | E | F |
|---|---|---|---|---|---|---|
| S3 | −4.813 | −0.119 | −0.078 | 0.089 | 0.037 | −0.028 |
| S4 | −4.472 | −0.27 | 0.244 | −0.197 | 0.109 | −0.02 |
| S5 | −2.29 | −0.193 | 0.102 | −0.03 | 3.96E−03 | −1.67E−04 |
| S6 | −4.316 | −0.1 | 0.039 | −0.01 | 1.15E−03 | −4.92E−05 |

In this embodiment, the curves of the field curvature, the distortion, the longitudinal chromatic aberration and the lateral chromatic aberration are shown in FIG. 6, FIG. 7, FIG. 8 and FIG. 9, respectively. Three curves from the negative axis direction to the positive axis direction illustrated in FIG. 8 respectively correspond to the longitudinal chromatic aberration curves of the infrared optical imaging lens 100 at the wavelength of 920 nm, 940 nm, and 960 nm. From FIG. 6 to FIG. 9, it is apparent that the field curvature, the distortion, and the chromatic aberration can be well corrected.

Embodiment 3

Figure 10:
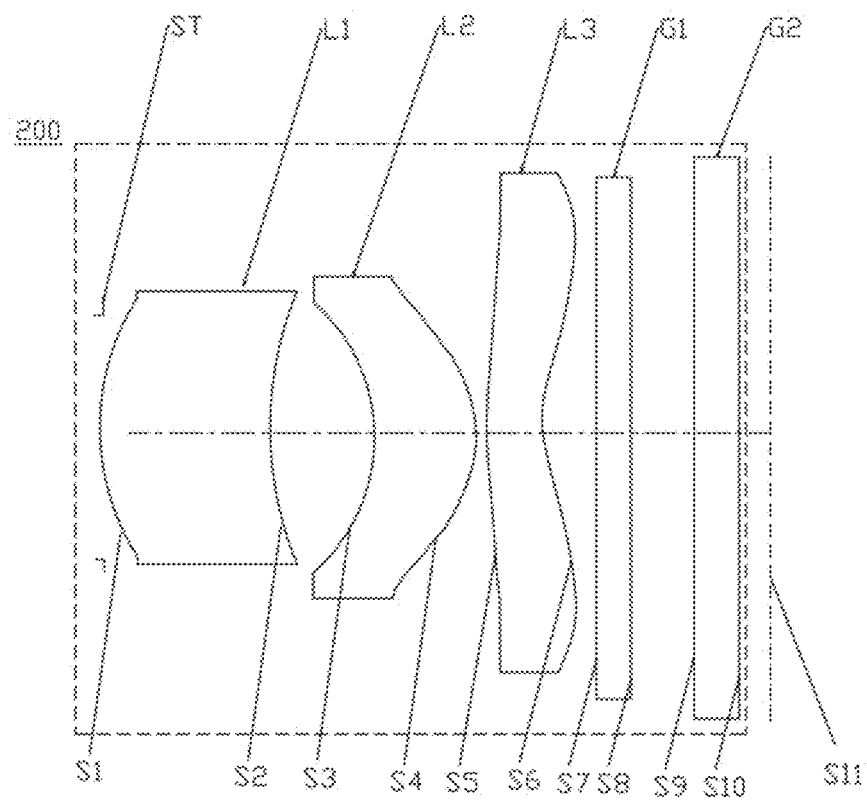
FIG. 10 is a schematic structural diagram of an infrared optical imaging lens in a third embodiment of the disclosure.
Figure 11:
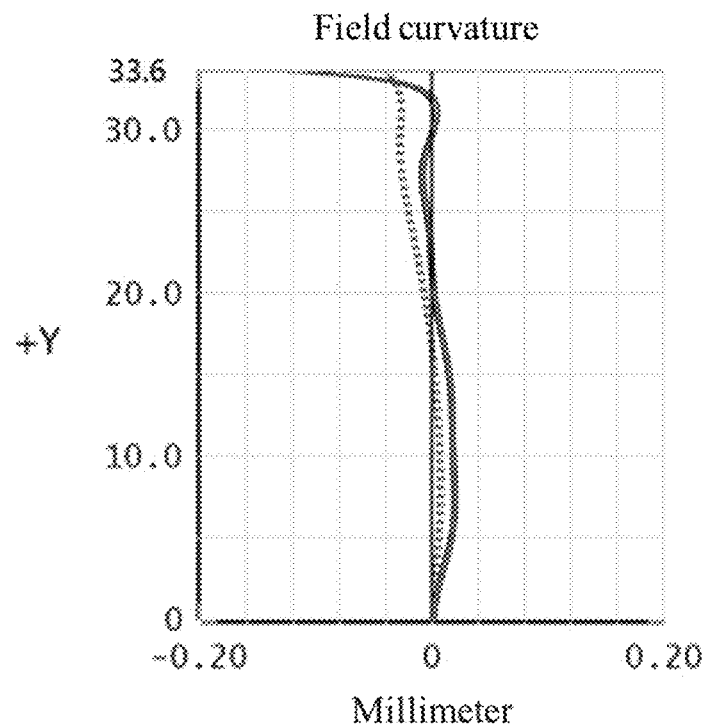
FIG. 11 is a diagram showing field curvature curves of the infrared optical imaging lens in the third embodiment of the disclosure.
Figure 12:
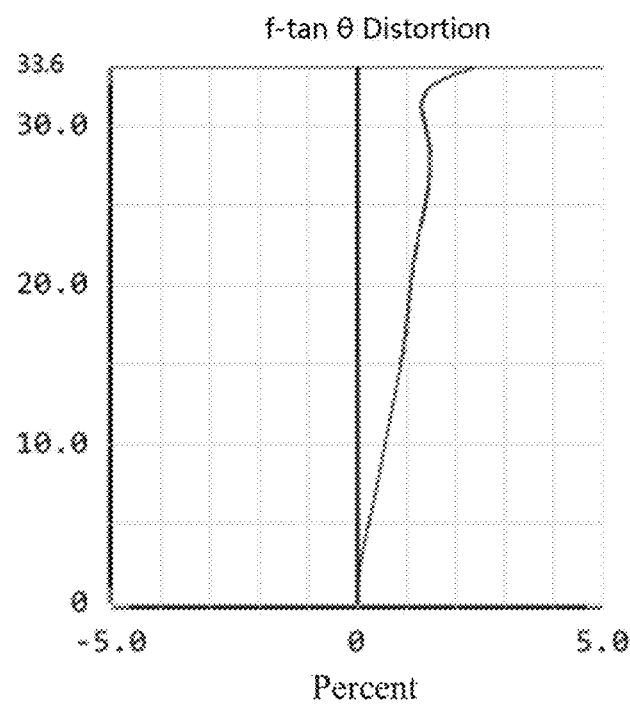
FIG. 12 is a diagram showing f-tan θ distortion curves of the infrared optical imaging lens in the third embodiment of the disclosure.
Figure 13:
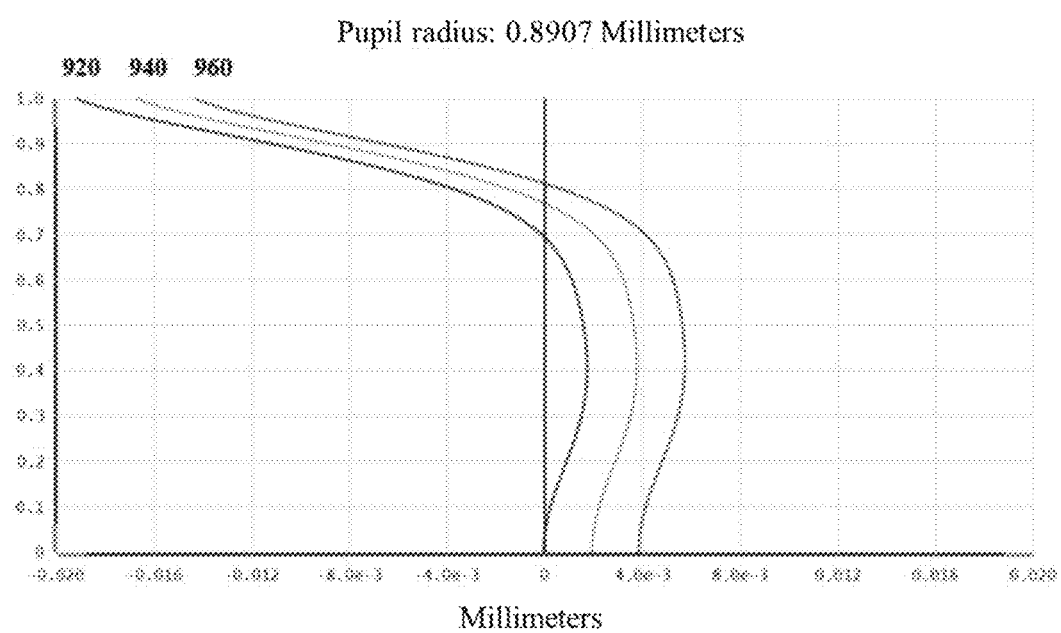
FIG. 13 is a diagram showing longitudinal aberration curves of the infrared optical imaging lens hi the third embodiment of the disclosure.
Figure 14:
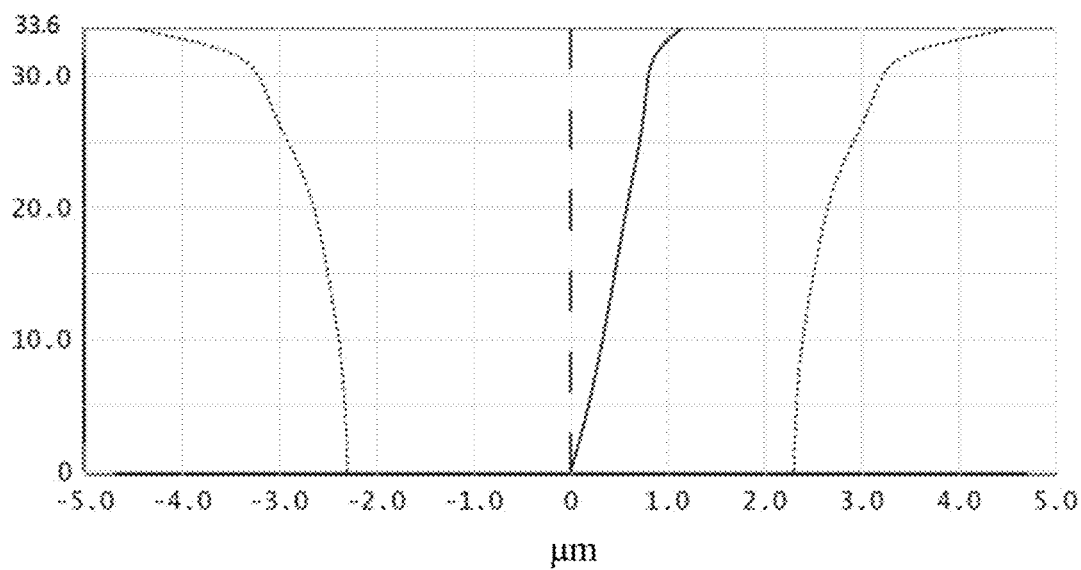
FIG. 14 is a diagram showing lateral chromatic aberration curves of the infrared optical imaging lens in the third embodiment of the disclosure.

FIG. 10 illustrates a schematic structural diagram of an infrared optical imaging lens 200 in a third embodiment of the disclosure. The structure of the infrared optical imaging lens 200 in this embodiment is similar to that of the infrared optical imaging lens 100 in the first embodiment except the following differences: the first lens L1 of the optical imaging lens 200 in this embodiment is a glass aspheric lens, the shape of the third lens L3 is different, and the radius of curvature and material selection of each lens are different from that of the first embodiment.

Relevant parameters of every lens of the infrared optical imaging lens 200 provided in this embodiment are shown in Table 5.

TABLE 5

| Surface NO. | Sign | Radius of curvature (mm) | Thickness (mm) | Refractive Index | Abbe number |
|---|---|---|---|---|---|
| | Object surface | — | | | |
| ST | Stop | — | −0.21 | | |
| S1 | First lens L1 | 1.744 | 1.25 | 1.59 | 67.0 |
| S2 | | 3.630 | 0.78 | | |
| S3 | Second lens L2 | −1.767 | 0.79 | 1.64 | 23.5 |
| S4 | | −0.870 | 0.06 | | |
| S5 | Third lens L3 | 3.636 | 0.50 | 1.64 | 23.5 |
| S6 | | 1.039 | 0.4 | | |
| S7 | Filter G1 | — | 0.30 | 1.52 | 64.2 |
| S8 | | — | 0.38 | | |
| S9 | Flat glass G2 | — | 0.40 | 1.52 | 64.2 |
| S10 | | — | 0.125 | | |
| S11 | Imaging surface | — | — | | |

In this embodiment, aspherical parameters of every lens of the optical imaging lens provided in this embodiment are shown in Table 6.

TABLE 6

| Surface No. | K | B | C | D | E | F |
|---|---|---|---|---|---|---|
| S1 | 0 | 3.61E−03 | 9.34E−03 | −0.018 | 0.024 | −0.011 |
| S2 | 0 | 0.036 | 0.048 | −0.054 | 0.08 | −0.021 |
| S3 | −4.257 | −0.173 | −0.027 | −0.024 | 0.09 | −0.012 |
| S4 | −3.782 | −0.268 | 0.209 | −0.181 | 0.09 | −0.014 |
| S5 | 0.371 | −0.141 | 0.086 | −0.027 | 3.79E−03 | −1.83E−04 |
| S6 | −6.861 | −0.076 | 0.031 | −6.13E−03 | 2.46E−04 | 2.95E−05 |

In this embodiment, the curves of the field curvature, the distortion, the longitudinal chromatic aberration and the lateral chromatic aberration are shown in FIG. 11, FIG. 12, FIG. 13 and FIG. 14, respectively. Three curves from the negative axis direction to the positive axis direction illustrated in FIG. 13 respectively correspond to the longitudinal chromatic aberration curves of the infrared optical imaging lens 200 at the wavelength of 920 nm, 940 nm, and 960 nm. From FIG. 1I to FIG. 14, it is apparent that the field curvature, the distortion, and the chromatic aberration can be well corrected.

Embodiment 4

An infrared optical imaging lens of this embodiment is substantially similar to the infrared optical imaging lens 100 of the first embodiment, except for the following differences: the first lens L1 of the infrared optical imaging lens in this embodiment is a glass aspheric lens, and the radius of curvature and material selection of each lens in the infrared optical imaging lens provided in this embodiment are different from that of the first embodiment.

Relevant parameters of every lens in the infrared optical imaging lens in this embodiment are shown in Tables 7.

TABLE 7

| Surface NO. | Sign | Radius of curvature (mm) | Thickness (mm) | Refractive index | Abbe number |
|---|---|---|---|---|---|
|  | Object surface | — |  |  |  |
| ST | Stop | — | −0.20 |  |  |
| S1 | First lens L1 | 1.683 | 1.34 | 1.53 | 70.3 |
| S2 |  | 4.361 | 0.83 |  |  |
| S3 | Second lens L2 | −1.393 | 0.60 | 1.66 | 20.9 |
| S4 |  | 0.806 | 0.04 |  |  |
| S5 | Third lens L3 | 4.848 | 0.59 | 1.66 | 20.9 |
| S6 |  | 1.173 | 0.4 |  |  |
| S7 | Filter G1 | — | 0.30 | 1.52 | 64.2 |
| S8 |  | — | 0.34 |  |  |
| S9 | Flat glass G2 | — | 0.40 | 1.52 | 64.2 |
| S10 |  | — | 0.125 |  |  |
| S11 | Imaging surface | — | — |  |  |

In this embodiment, aspherical parameters of every lens of the infrared optical imaging lens provided in this embodiment are shown in Table 8.

TABLE 8

| Surface No. | K | B | C | D | E | F |
|---|---|---|---|---|---|---|
| S1 | 0 | 3.27E−03 | −2.64E−03 | 6.87E−03 | −3.47E−03 | 0 |
| S2 | 0 | 0.034 | 0.041 | −0.017 | 0.021 | 0 |
| S3 | −9.552 | −0.514 | 0.465 | −0.6 | 0.611 | −0.216 |
| S4 | −4.03 | −0.443 | 0.53 | −0.603 | 0.389 | −0.091 |
| S5 | −30.717 | −0.017 | 0.023 | −9.44E−03 | 1.61E−03 | −9.66E−05 |

Figure 15:
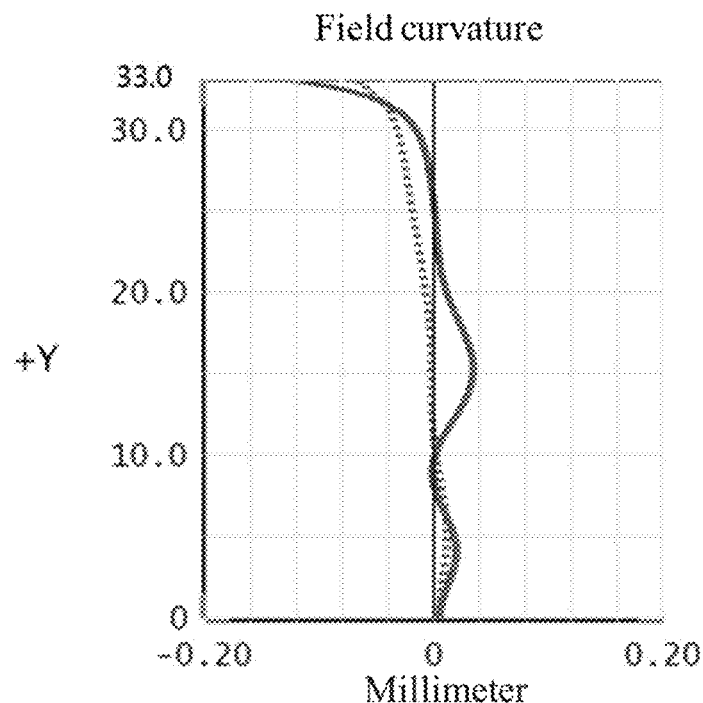
FIG. 15 is a diagram showing field curvature curves of the infrared optical imaging lens in a fourth embodiment of the disclosure.
Figure 16:
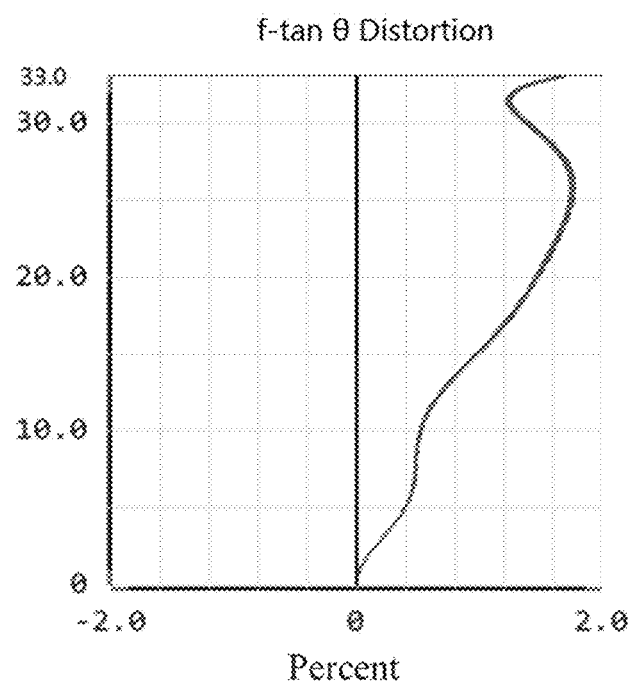
FIG. 16 is a diagram showing f-tan θ distortion curves of the infrared optical imaging lens in the fourth embodiment of the disclosure.
Figure 17:
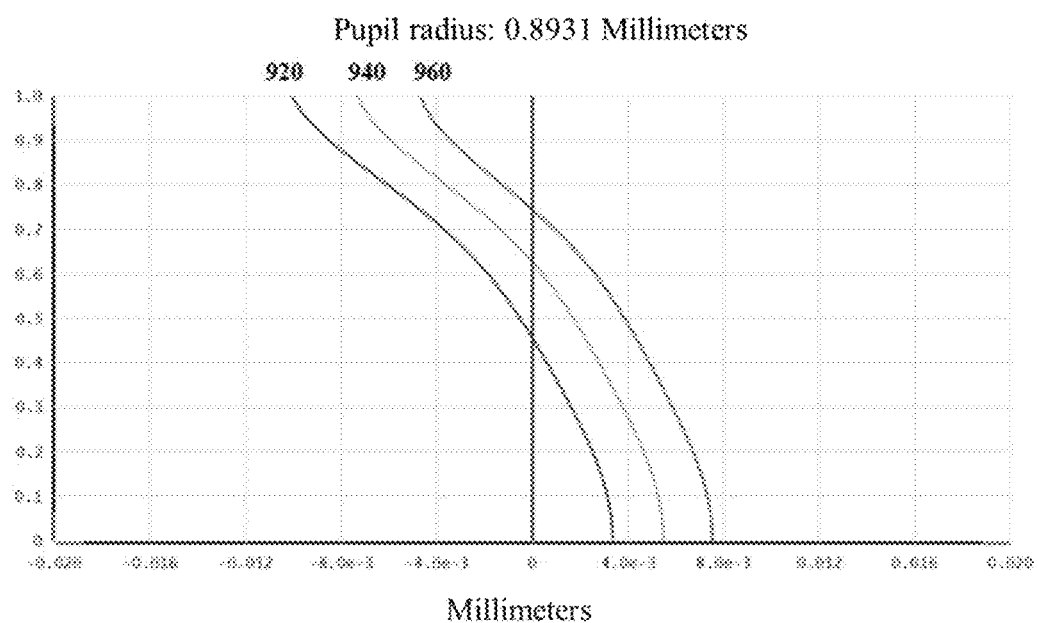
FIG. 17 is a diagram showing longitudinal aberration craves of the infrared optical imaging lens in the fourth embodiment of the disclosure.
Figure 18:
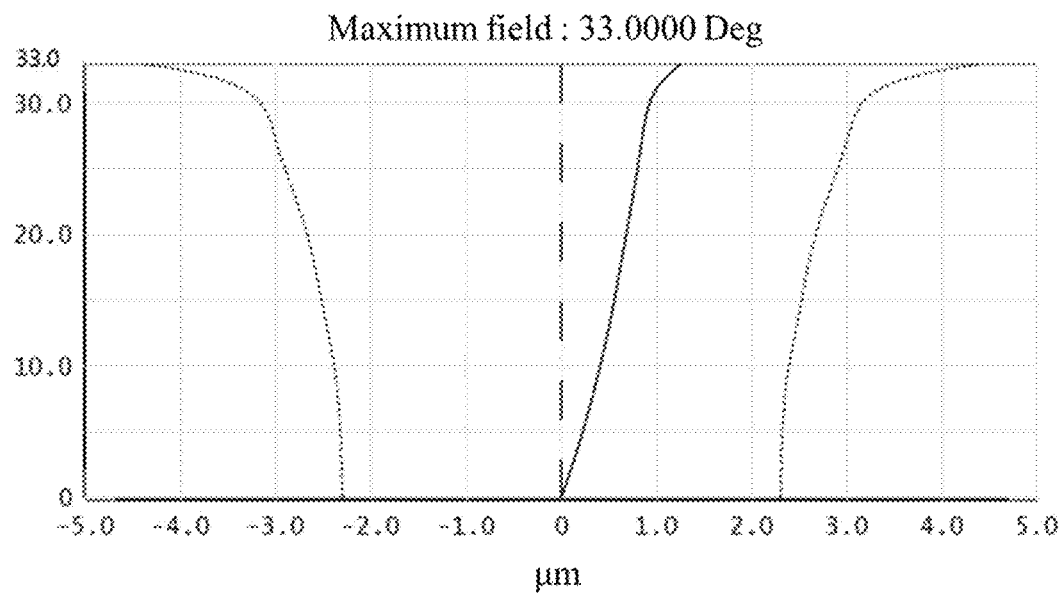
FIG. 18 is a diagram showing lateral chromatic aberration curves of the infrared optical imaging lens in the fourth embodiment of the disclosure.

In this embodiment, the curves of the field curvature, the distortion, the longitudinal chromatic aberration and the lateral chromatic aberration are shown in FIG. 15, FIG. 16. FIG. 17 and FIG. 18, respectively. Three curves from the negative axis direction to the positive axis direction illustrated in FIG. 17 respectively correspond to the longitudinal chromatic aberration curves of the infrared optical imaging lens 200 at the wavelength of 920 nm, 940 nm, and 960 nm. From FIG. 15 to FIG. 18, it is apparent that the field curvature, the distortion, and the chromatic aberration can be well corrected.

Table 9 shows the optical characteristics corresponding to the infrared optical imaging lens in the above four embodiments, including the focal length f, the aperture number Fno, and the field of view $2\theta$, the total optical length $T_L$, and the value corresponding to each of the above conditional expression.

Based on the foregoing embodiments, the infrared optical imaging lenses provided by the disclosure have reached the following optical indicators: (1) total optical length: $T_L$<5.1 mm; (2) applicable spectral range: 800 nm~1100 nm.

Based on the above embodiments, the infrared optical imaging lens provided by the disclosure has the following advantages:

(1) The infrared optical imaging lens provided by the disclosure adopts the design of three glass-plastic hybrid lenses, realizes the lens miniaturization through a reasonable combination of refractive power and reduces the manufacturing cost.

(2) The design wavelength of conventional lenses is at the range of 435~656 nm, which is the wavelength of visible light, so the conventional lenses have poor resolution in infrared. The infrared optical imaging lens provided by the disclosure can be clearly imaged in the 800 nm~1100 nm (near infrared region) waveband with good imaging quality, which can meet the requirements of infrared imaging characteristics and high imaging quality in DMS systems.

Embodiment 5

Figure 19:
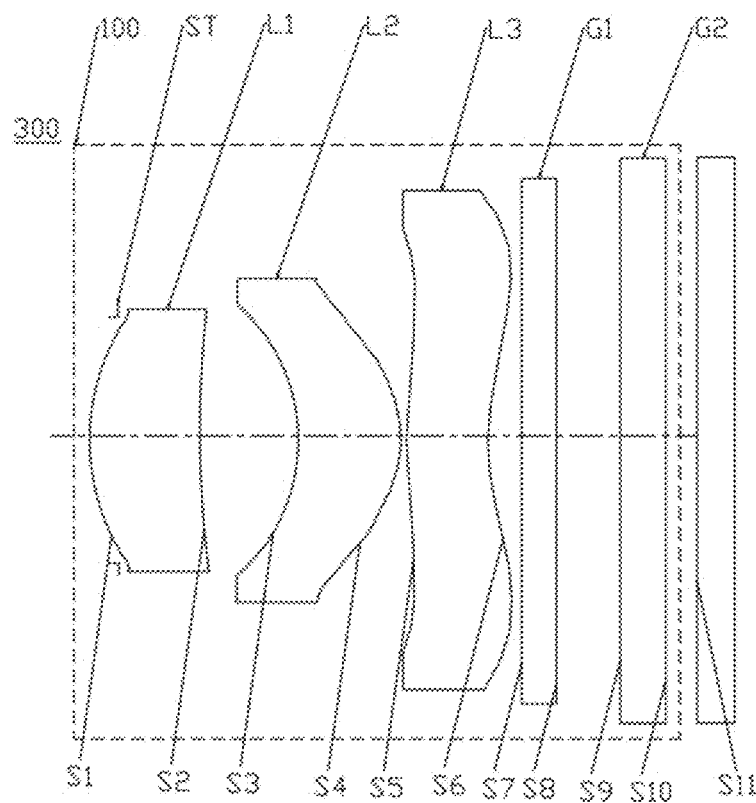
FIG. 19 is a schematic structural diagram of an imaging device in a fifth embodiment of the disclosure.

Please refer to FIG. 19, it is a schematic structural diagram of an imaging device 300 provided by the embodiment. The imaging device 300 includes an imaging element 310 and the infrared optical imaging lens in any of the foregoing embodiments, e.g., the infrared optical imaging lens 100 of the first embodiment. The imaging element 310 can be a Complementary Metal Oxide (CMOS) image sensor or a Charge Coupled Device Semiconductor (CCD) image sensor.

The imaging device 300 can be a sport camera, a panoramic camera, a driving recorder, a surveillance camera, a DMS camera, or any other form of electronic device equipped with an infrared optical imaging lens.

The imaging device 300 provided in this embodiment includes the infrared optical imaging lens 100. Not only the infrared optical imaging lens has the advantages of small

TABLE 9

| Embodiment | 1 | 2 | 3 | 4 |
|---|---|---|---|---|
| f(mm) | 3.60 | 3.54 | 3.56 | 3.57 |
| Fno | 1.99 | 2.01 | 2.01 | 2.01 |
| 2θ | 66.3° | 66.6° | 67.2° | 66.0° |
| $T_L$(mm) | 4.95 | 5.06 | 4.98 | 4.96 |
| $T_L$*tan θ/IH | 1.441 | 1.471 | 1.436 | 1.438 |
| |R11−R12|/CT1 | 4.156 | 3.684 | 1.514 | 1.995 |
| (φ2 + φ3)/φ | 0.199 | 0.277 | 0.314 | 0.276 |
| φ1/φ | 0.856 | 0.804 | 0.770 | 0.789 |
| (dn/dt)1 | 2.8 × 10$^{-6}$/° C. | 2.8 × 10$^{-6}$/° C. | −0.7 × 10$^{-6}$/° C. | 2.0 × 10$^{-6}$/° C. |
| (R11/R12)−(R22/R21) | −0.152 | −0.259 | −0.012 | −0.192 |
| SD11/f/tan θ | 0.653 | 0.657 | 0.664 | 0.649 |
| n2−n3 | 0 | 0 | 0 | 0 |
| v2−v3 | 0 | 0 | 0 | 0 |
| SD11/IH/SD32 | 0.182 | 0.178 | 0.170 | 0.176 | size and low cost, but also has good imaging quality under near-infrared light conditions and can provide higher quality imaging performance. Therefore, the imaging device 300 has the advantages of small size, low cost, and good imaging quality under near-infrared light conditions.

Embodiment 6

Figure 20:
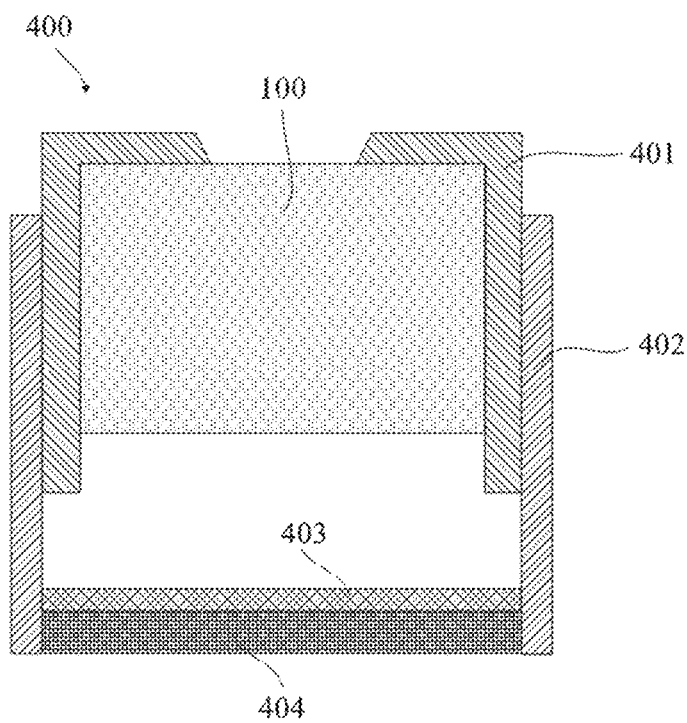
FIG. 20 is a schematic structural diagram showing a cross-section of a camera module according to a sixth embodiment of the disclosure.

FIG. 20 illustrates a structural diagram of a camera module 400. The camera module 400 includes a barrel 401, a holder 402, an image sensor 403, a printed circuit board 404, and the infrared optical imaging lens of any one of the foregoing embodiments. FIG. 20 hikes the infrared optical imaging lens 100 of the first embodiment as an example. The infrared optical imaging lens 100 is mounted in the barrel 401, the image sensor 403 is mounted in the holder 402, and the barrel 401 is movably mounted on the holder 402. The infrared optical imaging lens 100 is configured to form an optical image. The image sensor 403 is opposite to the infrared optical imaging lens 100 and is configured to generate image data for the optical image sensed thereby. The image sensor 403 may be a CMOS sensor or a CCD sensor.

It is noted that the image sensor 403 may be mounted on the printed circuit board 404, or may be electrically connected with a processing chip, to process the image data.

Embodiment 7

Figure 21:
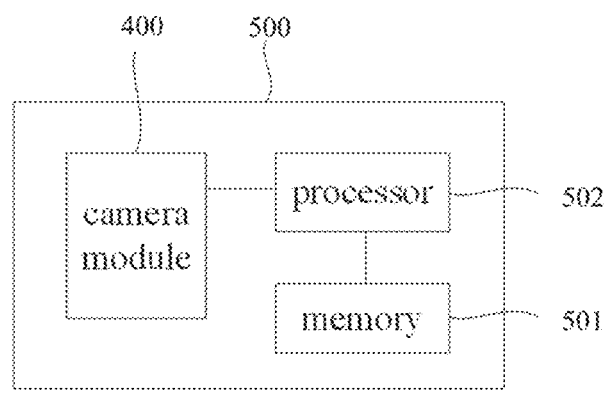
FIG. 21 is a schematic block diagram of a DMS according to a seventh embodiment of the disclosure.
Figure 22:
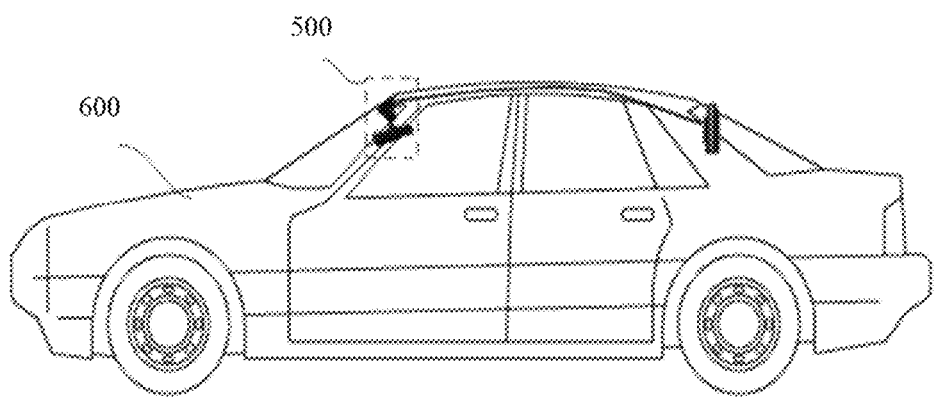
FIG. 22 is a schematic diagram of the DMS according to the seventh embodiment of the disclosure.

FIG. 21 is a block diagram of a DMS 500 provided in this embodiment. The DMS 500 includes a memory 501, a processor 502, and the camera module 400 as described above. The memory 501 and the camera module 400 are both electrically connected with the processor 502. The camera module 400 is configured to capture images, the processor 502 is configured to acquire and process image data of the captured images, the memory 501 is configured to store the image data of the captured images. As illustrated in FIG. 22, the DMA 500 is installed in a car 600, and is configured to monitor the driver, thereby ensuring the safety of the driving.

The above embodiments just describe some implementation manners of the disclosure, the descriptions are specific and detailed, but cannot be understood as limiting the scope of the application. It should be noted that, for those of ordinary skill in the art, without departing from the concept of the application, modifications and improvements can be made, which should belong to the protection scope of the application. Therefore, the protection scope of this application should be subject to the appended claims.

What is claimed is:

1. An infrared optical imaging lens, from an object side to an image side along an optical axis thereof, sequentially comprising:
    a stop;
    a first lens with a positive refractive power, an object side surface of the first lens being convex, an image side surface of the first lens being concave;
    a second lens with a positive refractive power, an object side surface of the second lens being concave, an image side surface of the second lens being convex; and
    a third lens with a negative refractive power, a paraxial portion of an object side surface of the third lens being convex, a paraxial portion of an image side surface of the third lens being concave;
    wherein the first lens is a glass lens, the second lens and the third lens are both plastic aspherical lenses;
    wherein the infrared optical imaging lens meets the expression: $T_L/(IH/\tan\theta) < 1.5$, where $T_L$ represents a total optical length of the infrared optical imaging lens, $\theta$ represents a half-field of view of the infrared optical imaging lens, IH represents a half image height of the infrared optical imaging lens;
    wherein the infrared optical imaging lens further meets the expression:

$$0.16 \text{ mm}^{-1} < SD11/IH/SD32 < 0.19 \text{ mm}^{-1},$$

where SD11 represents a maximum effective radius of the object side surface of the first lens, and SD32 represents a maximum effective radius of the image side surface of the third lens.

2. The infrared optical imaging lens as claimed in claim 1, wherein the infrared optical imaging lens meets the expression:

$$1 < |R11-R12|/CT1 < 5;$$

where R11 represents a radius of curvature of the object side surface of the first lens, R12 represents a radius of curvature of the image side surface of the first lens, CT1 represents a center thickness of the first lens.

3. The infrared optical imaging lens as claimed in claim 1, wherein the infrared optical imaging lens meets the expression:

$$0.15 < (\varphi 2+\varphi 3)/\varphi < 0.35;$$

where $\varphi 2$ represents a refractive power of the second lens, $\varphi 3$ represents a refractive power of the third lens, $\varphi$ represents a refractive power of the infrared optical imaging lens.

4. The infrared optical imaging lens as claimed in claim 1, wherein the infrared optical imaging lens meets the expression:

$$0.7 < \varphi 1/\varphi < 0.9;$$

where $\varphi 1$ represents a refractive power of the first lens, $\varphi$ represents a refractive power of the infrared optical imaging lens.

5. The infrared optical imaging lens as claimed in claim 1, wherein the infrared optical imaging lens meets the expression:

$$-1.0 \times 10^{-6}/°\text{C.} < (dn/dt)1 < 3.0 \times 10^{-6}/°\text{C.};$$

where $(dn/dt)1$ represents a temperature coefficient of the refractive index of the first lens.

6. The infrared optical imaging lens as claimed in claim 1, wherein the infrared optical imaging lens meets the expression:

$$-0.3 < (R11/R12)-(R22/R21) < 0,$$

where R11 represents a radius of curvature of the object side surface of the first lens, R12 represents a radius of curvature of the image side surface of the first lens, R21 represents a radius of curvature of the object side surface of the second lens, R22 represents a radius of curvature of the image side surface of the second lens.

7. The infrared optical imaging lens as claimed in claim 1, wherein the infrared optical imaging lens meets the expression:

$$SD11/f\tan\theta < 0.67,$$

where f represents an effective focal length of the infrared optical imaging lens.

8. The infrared optical imaging lens as claimed in claim 1, wherein the infrared optical imaging lens meets the expressions:

$$n2-n3=0, v2-v3=0;$$

where n2 represents a refractive index of the second lens, n3 represents a refractive index of the third lens, v2 represents a dispersion coefficient of the second lens, and v3 represents a dispersion coefficient of the third lens.

9. The infrared optical imaging lens as claimed in claim 1, wherein an applicable spectral range of the infrared optical imaging lens is 800 nm to 1100 nm.

10. The infrared optical imaging lens as claimed in claim 1, wherein the first lens is a glass aspherical lens.

11. A camera module, comprising a barrel, a holder, an image sensor, and an infrared optical imaging lens, wherein the infrared optical imaging lens is mounted in the barrel, the image sensor is mounted in the holder, and the barrel is movably mounted on the holder, the infrared optical imaging lens is configured to form an optical image, the image sensor is configured to generate image data for the optical image sensed thereby, wherein the infrared optical imaging lens comprising:
 a stop;
 a first lens with a positive refractive power, an object side surface of the first lens being convex, an image side surface of the first lens being concave;
 a second lens with a positive refractive power, an object side surface of the second lens being concave, an image side surface of the second lens being convex; and
 a third lens with a negative refractive power, a paraxial portion of an object side surface of the third lens being convex, a peripheral portion of the object side surface of the third lens being concave, a paraxial portion of an image side surface of the third lens being concave, a peripheral portion of the image side surface of the third lens being convex;
 wherein the first lens is a glass lens, the second lens and the third lens are both plastic aspherical lenses;
 wherein the infrared optical imaging lens meets the expression: $T_L/(IH/\tan\theta)<1.5$, where $T_L$ represents a total optical length of the infrared optical imaging lens, $\theta$ represents a half-field of view of the infrared optical irriging lens, IH represents a half image height of the infrared optical imaging lens;
 wherein the infrared optical imaging lens meets the expressions:

$$0.15<(\varphi 2+\varphi 3)/\varphi<0.35;$$

where $\varphi 2$ represents a refractive power of the second lens, $\varphi 3$ represents a refractive power of the third lens, $\varphi$ represents a refractive power of the infrared optical imaging lens.

12. The camera module as claimed in claim 11, wherein the infrared optical imaging lens meets the expressions:

$$1<|R11-R12|/CT1<5;$$

where R11 represents a radius of curvature of the object side surface of the first lens, R12 represents a radius of curvature of the image side surface of the first lens, CT1 represents a center thickness of the first lens.

13. The camera module as claimed in claim 11, wherein the infrared optical imaging lens meets the expressions:

$$0.7<\varphi 1/\varphi<0.9;$$

where $\varphi 1$ represents a refractive power of the first lens.

14. The camera module as claimed in claim 11, wherein the infrared optical imaging lens meets the expressions:

$$-1.0\times 10^{-6}/°\text{ C.}<(dn/dt)1<3.0\times 10^{-6}/°\text{ C.};$$

where $(dn/dt)1$ represents a temperature coefficient of the refractive index of the first lens material.

15. The camera module as claimed in claim 11, wherein the infrared optical imaging lens meets the expressions:

$$-0.3<(R11/R12)-(R22/R21)<0,$$

where R11 represents a radius of curvature of the object side surface of the first lens, R12 represents a radius of curvature of the image side surface of the first lens, R21 represents a radius of curvature of the object side surface of the second lens, R22 represents a radius of curvature of the image side surface of the second lens.

16. The camera module as claimed in claim 11, wherein the infrared optical imaging lens meets the expressions:

$$SD11/f/\tan\theta<0.67,\ n2-n3=0, v2-v3=0;$$

where SD11 represents a maximum effective radius of the first lens object side, f represents an effective focal length of the infrared optical imaging lens, n2 represents a refractive index of the second lens, n3 represents a refractive index of the third lens, v2 represents a dispersion coefficient of the second lens, and v3 represents a dispersion coefficient of the third lens.

17. A driver monitor system, comprising a memory, a processor, and a camera module, the memory and the camera module being electrically connected with the processor, the memory being configured to store image data, the processor being configured to process the image data, the camera module comprising an infrared optical imaging lens and an image sensor, the image sensor being opposite to the infrared optical imaging lens and configured to sense and generate the image data, the infrared optical imaging lens sequentially comprising;
 a stop;
 a first lens with a positive refractive power, an object side surface of the first lens being convex, an image side surface of the first lens being concave;
 a second lens with a positive refractive power, an object side surface of the second lens being concave, an image side surface of the second lens being convex; and
 a third lens with a negative refractive power, a paraxial portion of an object side surface of the third lens being convex, a paraxial portion of an image side surface of the third lens being concave;
 wherein the first lens is a glass lens, the second lens and the third lens are both plastic aspherical lenses;
 wherein the infrared optical imaging lens meets the expressions:

$$T_L/(IH/\tan\theta)<1.5,$$

$$1<|R11-R12|/CT1<5;$$

$$0.15<(\varphi 2+\varphi 3)/\varphi<0.35;$$

$$0.7<\varphi 1/\varphi<0.9;$$

where $T_L$ represents a total optical length of the infrared optical imaging lens, $\theta$ represents a half-field of view of the infrared optical imaging lens, IH represents a half image height of the infrared optical imaging lens, R11 represents a radius of curvature of the object side surface of the first lens, R12 represents a radius of curvature of the image side surface of the first lens, CT1 represents a center thickness of the first lens, $\varphi 1$ represents a refractive power of the first lens, $\varphi 2$ represents a refractive power of the second lens, $\varphi 3$ represents a refractive power of the third lens, $\varphi$ represents a refractive power of the infrared optical imaging lens.

\* \* \* \* \*